(12) United States Patent
Stearns et al.

(10) Patent No.: US 11,825,918 B2
(45) Date of Patent: Nov. 28, 2023

(54) MAGNETIC COUPLING DEVICE WITH MECHANICAL INTERLOCK FEATURES

(71) Applicants: Jacob Stearns, Troy, MI (US); Robert L. Stearns, Troy, MI (US)

(72) Inventors: Jacob Stearns, Troy, MI (US); Robert L. Stearns, Troy, MI (US)

(*) Notice: Subject to any disclaimer, the term of this patent is extended or adjusted under 35 U.S.C. 154(b) by 0 days.

(21) Appl. No.: 17/707,485

(22) Filed: Mar. 29, 2022

(65) Prior Publication Data

US 2023/0309661 A1 Oct. 5, 2023

(51) Int. Cl.
*A44B 11/25* (2006.01)
*F16B 1/00* (2006.01)

(52) U.S. Cl.
CPC ............ *A44B 11/2588* (2013.01); *F16B 1/00* (2013.01); *A44D 2203/00* (2013.01); *F16B 2001/0035* (2013.01)

(58) Field of Classification Search
CPC ............ A44B 11/2588; A44B 11/2584; A44B 11/258; A44D 2203/00; F16B 1/00
See application file for complete search history.

(56) References Cited

U.S. PATENT DOCUMENTS

| | | | |
|---|---|---|---|
| 6,292,985 B1 | 9/2001 | Grunberger | |
| 6,505,385 B2 | 1/2003 | Grunberger | |
| 8,464,403 B2 | 6/2013 | Fiedler | |
| 9,677,581 B2 | 6/2017 | Tucholke et al. | |
| 9,936,772 B2* | 4/2018 | Paik | A44B 11/2588 |
| 10,085,521 B2* | 10/2018 | Chen | A45C 13/1069 |
| 10,212,993 B2 | 2/2019 | Fiedler et al. | |
| 10,813,415 B2 | 10/2020 | Lee et al. | |

FOREIGN PATENT DOCUMENTS

WO 2021148495 A1 7/2021

* cited by examiner

*Primary Examiner* — Robert Sandy
(74) *Attorney, Agent, or Firm* — Robert L. Stearns; Dickinson Wright PLLC

(57) ABSTRACT

A coupling device for releasably coupling two parts with one another includes first and second coupling members having magnets for holding the members with a magnetic holding force to self-center the members in an intermediate position. The coupling members are slidable to a locked condition in which mutual interlock portions engage and slidable to an unlocked position in which mutual unlock portions engage. The coupling members are uncoupled by sliding the members along a first unlocking path to the unlocked position and further moving the members along a directionally different separation path.

20 Claims, 11 Drawing Sheets

MAGNETIC COUPLING DEVICE WITH MECHANICAL INTERLOCK FEATURES

BACKGROUND OF THE INVENTION

1. Technical Field

This invention relates generally to magnetic coupling devices for magnetically connecting first and second coupling members with each other, and more particularly to such devices that include mechanical interlock features which supplement the magnetic connection.

2. Related Art

Hunters, hikers, explorers, day walkers and other outdoor enthusiasts often wish to carry a variety of articles with them on their ventures. They often use carabiners which they can link to moly webbing on a backpack or through their belt loop to connect the articles. One drawback to carabiners is that they have limited strength and items can be inadvertently lost if they become snagged while walking through the woods and overcome the retention force or spring latch of the carabiner.

Magnetic coupling devices are also known in which first and second coupling members are provided with magnetic portions which are configured to magnetically attract the members into a coupled condition when the magnets are brought into close proximity. For outdoor ventures, particularly through the woods, the holding force provide by the magnets alone would be insufficient to safely secure items from being lost through inadvertent disconnection. Some magnetic coupling devices have added mechanical interlock features, but they too are susceptible to inadvertent disconnection since in many cases all that is required to disconnect them is to apply a slight directional release force to a pull tab. With such devices, the features that make them attractive are the same features that limit their usefulness. In particular, the ease of connection and disconnection is seen as a positive attribute since they work well when items are to be hooked and unhooked from a belt or backpack or other locations where the user cannot readily see the coupling parts connect and disconnect. However, the ease by which they may disconnect raises concern over the security of the device and possible loss of items due to unintended disconnection.

SUMMARY OF THE INVENTION

It is an object of the invention to provide a magnetic coupling device with improved interlock that provides ease of connection while also proving increased security against inadvertent disconnection.

Such a magnetic coupling device with interlock features for releasably connecting two parts with each other, comprises a first coupling member having a magnetic portion, a second coupling member having a magnetic portion that is magnetically attracted to the magnetic portion of the first coupling member for selectively uniting the first and second coupling members in a magnetically coupled condition when the members are moved along a prescribed coupling path. The first and second coupling members are slidable relative to one another in a slide plane along a longitudinal slide path between a forward-most locked position and a rearward-most blocked position while in the magnetically coupled condition. The first and second coupling members have mutual engagement surfaces which engage when the first and second coupling members are slid into the locked position and act to lock the members against separation in response to application of a linear force within the slide plane or perpendicular to the slide lane. The mutual engagement surfaces further engage when the first and second coupling members are slid from the locked position to the blocked position to lock the members against separation in response to application of a linear force within the slide plane or perpendicular to the slide plane. The mutual engaging surfaces are further arranged to enable separation of the first and second coupling members when in the locked position by first sliding the members to the blocked position and then moving the members away from each other along a separation path that is non-perpendicular to the slide plane.

The securement of the coupling members against disconnection by forces acting within and perpendicular to the slide plane in both the locked and blocked positions guards against accidental uncoupling. Rather, two motions are required for the disconnection, first sliding the second coupling member from the locked to the blocked position and then moving the members away from one another along a separation path that is non-perpendicular to the slide plane. The second movement may be translational or pivotal. Such dual path movement adds an extra level of certainly that the members will not accidently disconnect when an external force from a snag or pull is exerted on the members.

It is contemplated that the device may be employed on a belt or backpack or other structure with the forward end facing downwardly and the rearward end facing upwardly. When worn on a belt, for example, a user may connect and disconnect the members with one hand using only a finger or a finger and thumb. According to a preferred feature, the second coupling member is provided with a head that extends forwardly and when pressed, is caused to slide rearwardly to the blocked position and to then pivot toward the first coupling member, raising the rearward end of the second coupling member out of magnetic coupling with the first coupling member.

According to another aspect, a coupling device for releasably coupling two parts with one another includes a first coupling member having a first magnetic portion and a second coupling member having a second magnetic portion. The first and second magnetic portions magnetically attract when selectively positioned to magnetically couple the first and second coupling members together with a magnetic holding force. The first coupling member has a rigid first interlock portion and the second coupling member has a rigid second interlock portion. The second interlock portion engages the first interlock portion when the second coupling member is moved to a locked position to mechanically couple the first and second coupling members against separation and to limit relative displacement of the first and second coupling members in a first load bearing direction. The first coupling member has a rigid first unlock portion and the second closure member has a rigid second unlock portion. The second coupling member is slideable along an unlocking path out of the locked position and into an unlocked position in which the first unlock portion engages the second unlock portion. The second coupling member, when in the unlocked position, is releasable from the first closure member by displacing the second coupling member away from the first coupling member along a release path that is directionally different than the unlocking path with sufficient force to overcome the magnetic holding force.

According to a further aspect, the second coupling member includes a plurality of legs that are received in corresponding recesses of the first connecting member. The legs have feet at their ends which extend into undercut slots of the recesses when in the locked condition. The feet further interfere with engaging structure of the first coupling member when in the blocked condition to preclude separation in the perpendicular direction.

According to a further aspect, the second coupling member includes a forwardly projecting head portion and a rearwardly projecting tail portion which assist in longitudinal guidance of the members when sliding between the locked and blocked positions. The sides of head and tail portions also interact with surfaces of the first coupling member to restrain the members against lateral separation in the sliding plane. The tail portion also is preferably dimensioned to project rearward when in the blocked position to present a ledge that can be lifted by a finger or thumb to release the second coupling member from the first coupling member.

According to a further aspect, the magnetic portions comprise two sets of permanent magnets that have different polar orientations enable magnetic connection of the members in only one way. The magnets are also preferably self-centering and relatively positioned to center the second coupling member intermediate the locked and blocked positions when magnetically coupled.

BRIEF DESCRIPTION OF THE DRAWINGS

These and other advantages and features will be better understood when considered in connection with the following derailed description and appended drawings, in which.

DETAILED DESCRIPTION OF THE PREFERRED EMBODIMENTS

Figure 1:
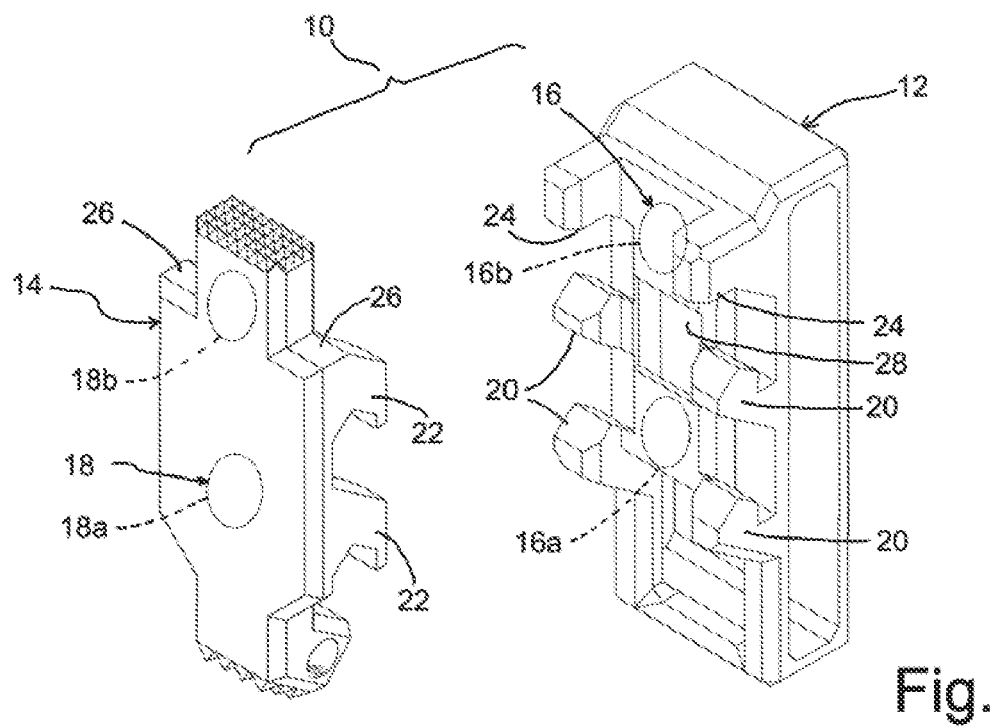
FIG. 1 is an exploded isometric view of a coupling device according to a first embodiment.
Figure 2:
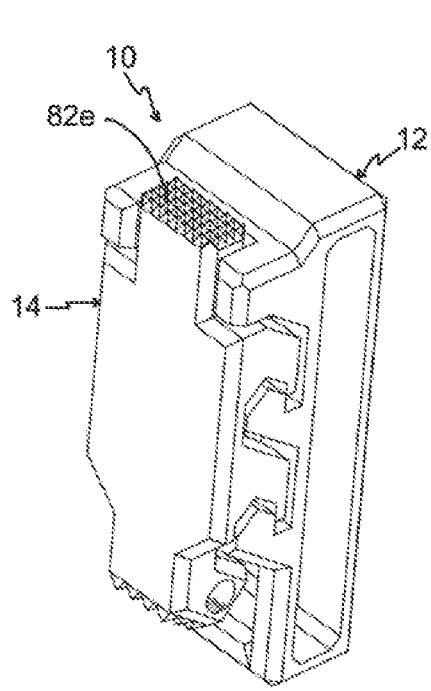
FIGS. 2 and 3 are isometric views of the device in a magnetically coupled condition.
Figure 3:
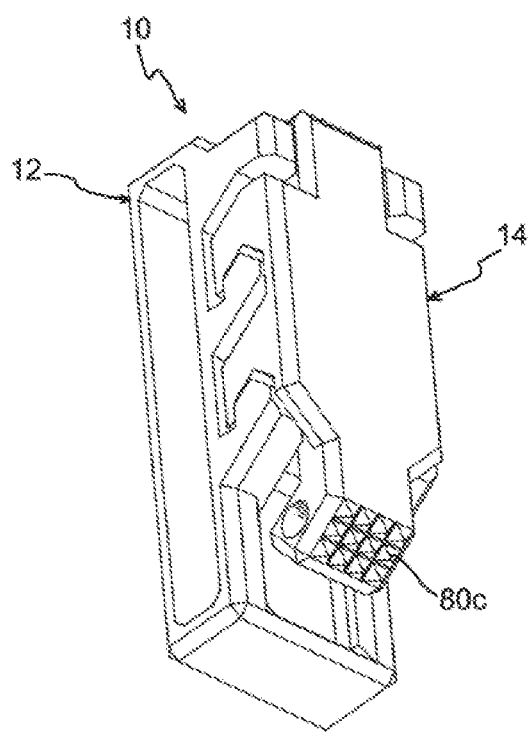

With initial reference to FIGS. 1-3, an embodiment of a magnetic coupling device is shown generally at 10 and includes a first coupling member 12 and a second coupling member 14. The coupling members 12, 14 may be from any of a number of materials including plastics, composites, and metals and their alloys. Exemplary plastics include polyactic acid (PLA); acrylonitrile styrene acrylate (ASA), nylon, glass-filled nylon, etc. Exemplary metals include aluminum, steel, magnesium, titanium and alloys thereof.

The first coupling member 12 has a first magnetic portion 16 and the second coupling member 14 has a second magnetic portion 18. The magnetic portions 16, 18 are constituted to magnetically interact when brought into proximity of one another for selectively uniting the first and second coupling members 12, 14 with a magnetic holding force in a magnetically coupled condition when moved along prescribed coupling path. FIGS. 2 and 3 illustrate the first 12 and second 14 coupling members in the magnetically coupled condition. Details of a preferred embodiment of the magnetic portions 16, 18 are described below.

Figure 4:
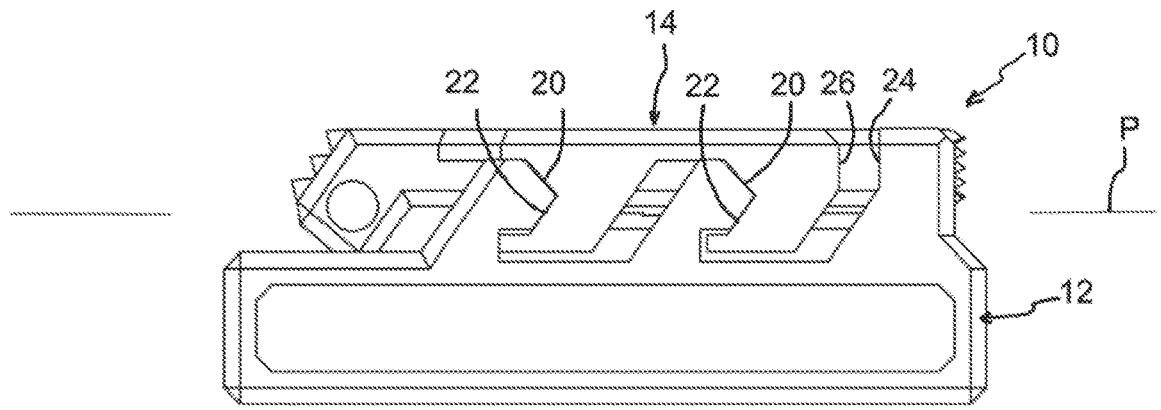
FIGS. 4-6 are side elevation views of the device shown in locked, intermediate and unlocked positions.
Figure 5:
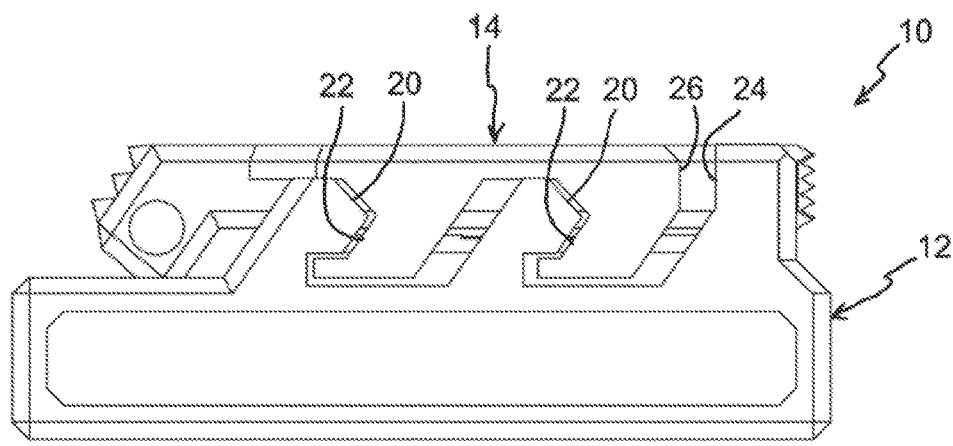

The first coupling member 12 includes a first interlock portion 20 and the second coupling member 16 includes a second interlock portion 22. The interlock portions 20, 22 are rigid and physically and positively engage one another when the coupling members 12, 14 are moved to a locked position but are physically spaced out of engagement when moved out of the locked position. FIG. 4 illustrates the coupling members 12, 14 in the locked position. In this regard, it will be understood that the coupling members 12, 14 are displaceable relative to one another while magnetically coupled, and more particularly are slidable in a slide plane P between the locked position shown in FIG. 4, an unlocked position shown in FIG. 6, and intermediate positions therebetween, one of which is illustrated in FIG. 5. Further details of interlock portions 20, 22 will be described below.

Figure 6:
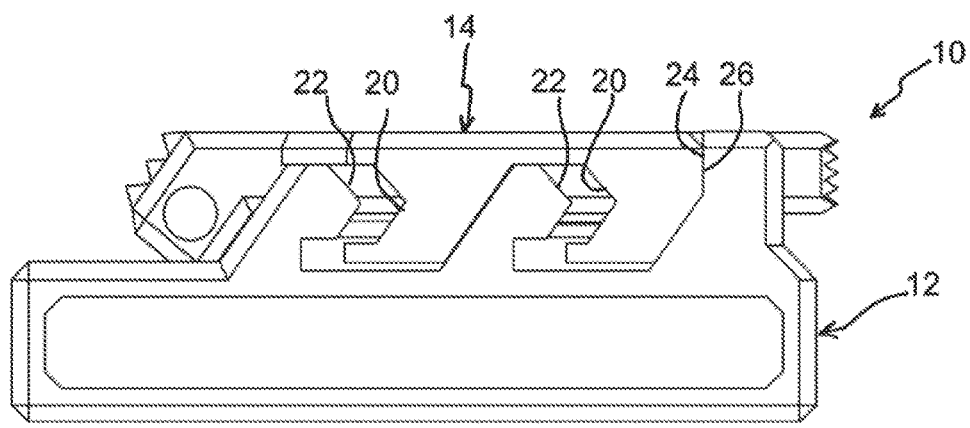

The first coupling member 12 includes a first unlock portion 24 and the second coupling member includes a second unlock portion 26. The unlock portions 24, 26 physically and positively engage one another when the coupling members 12, 14 are moved from the locked position (FIG. 4) to the unlocked position (FIG. 6). For reference purposes, the device 10 is said to have a first or forward end which is shown to the left in FIGS. 4-6 and a second or rearward end which is shown to the right in FIGS. 4-6. Of course, the orientation in actual use may be other than horizontal, such as in an up and down orientation as illustrated in FIGS. 1 and 2, wherein the forward end may be directed generally downwardly, such as when the first coupling member 12 is mounted on user's belt or a strap, and the rearward end directed generally upwardly.

The locked position (FIG. 4) represents the condition of the device 10 in which the second coupling member 16 has been slid in the slide plane P to an extreme longitudinal forward position (to the left in FIG. 4) so that opposing forward and rearward facing surfaces of the interlock portions 20, 22 are caused to positively engage one another. In the locked position, the unlock portions 24, 26 are spaced apart and are not engaged. The unlocked condition (FIG. 6) represents the condition in which the second coupling member 16 has been slid in the slide plane P in the opposite direction along an unlocking path to an extreme rearward position to cause opposing forward and rearward surfaces of the unlock portions 24, 26 to confront one another. In the unlocked position, the facing surfaces of the interlock portions 20, 22 are spaced longitudinally apart do not engage. In between these two extreme locked and unlocked positions, the forward and rearward facing surfaces of the interlock portions 20, 22 and unlock portions 24, 26 are spaced from one another and do not positively engage, as illustrated in FIG. 5. The magnetic portions 16, 18 maintain their magnetic holding force to keep the portions together during the sliding movement between the locked, unlocked and intermediate positions, with the interlock portions 20, 22 providing a supplemental mechanical holding force when they interact with each other. The sliding movement of the coupling members 12, 14 in the plane P facilitates the coupling and uncoupling of the members 12, 14 as well as the ability of the device 10 to carry a load as will be described below.

The magnetic portions 16, 18 may comprise distinct magnet components such as permanent magnets or may comprise a ferromagnetic material such as steel. According to a preferred embodiment, the magnetic portions 16, 18 comprise one or more permanent magnets, such as rare earth permanent magnets. One exemplary magnet is a neodymium magnet. The strength of the magnets may be selected to provide greater or lesser attracting and holding force. A neodymium N35, for example, may be used for all or some of the magnetic portions 16, 18.

Figure 7:
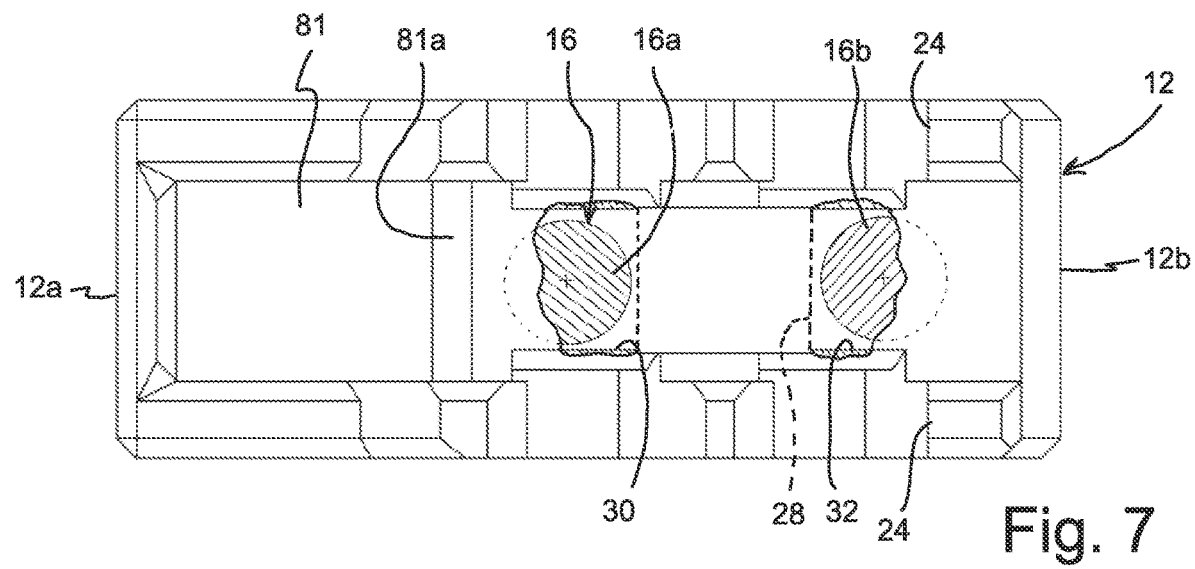
FIG. 7 is a top plan view of the first coupling member shown partly broken away.

FIG. 7 illustrates the first coupling member 12 shown fitted with a pair of magnets 16a, 16b. Magnet 16a is provided adjacent a forward end 12a of the first coupling member 12 and magnet 16b is provided adjacent a rearward end 12b of the first coupling member 12 and spaced longitudinally from the forward magnet 16a. The magnets 16a, 16b are embedded in whole or part within the structure of the first coupling member 12. In the illustrated embodiment, the magnets 16a, 16b are separately made and incorporated into the first coupling member 12. More particularly, the magnets 16a, 16b may be molded into the first coupling member 12, or openings may be formed in the first coupling member 12 into which the magnets 16a, 16b may be inserted into associated recesses or pockets of the first coupling member 12. FIGS. 1 and 7 illustrate a slot opening 28 in the first coupling member 12 providing access to a forward blind pocket 30 for receiving the forward magnet 16a and for proving access also to a rearward blind pocket 32 for receiving the rearward magnet 16b. The magnets 16a, 16b may be permanently secured within their pockets by a bonding agent such as an epoxy resin. The bonding agent may further close some or all of the opening 28.

Figure 8:
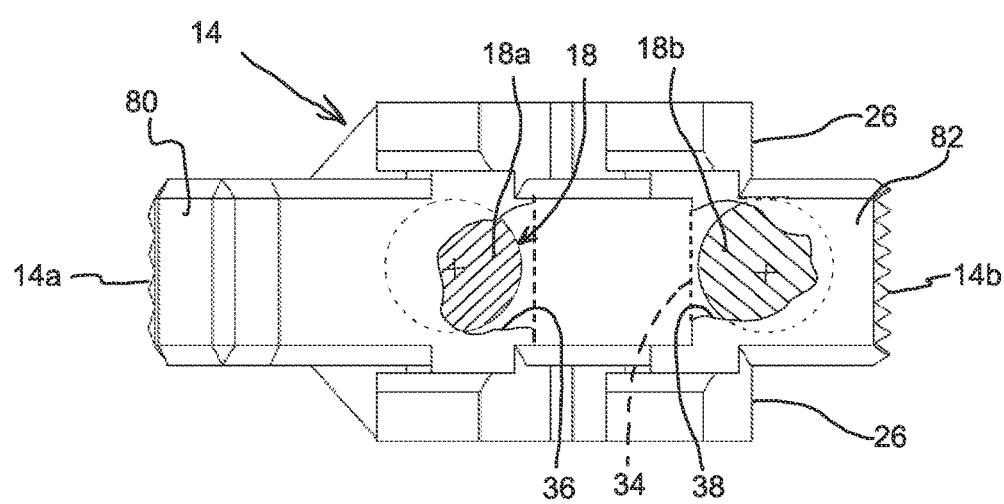
FIG. 8 is a bottom plan view of the of the second coupling member shown partly broken away.

FIG. 8 shows the second coupling member 14 fitted with a forward magnet 18a and a rearward magnet 18b adjacent forward 14a and rearward 14b ends of the second coupling member 14. The magnets 18a, 18b may be molded or otherwise incorporated into the structure of the second coupling member 14. Like the first coupling member 12, the second coupling member may include one or more recesses or openings to receive the magnets 18a, 18b. Such an opening 34 is shown in FIG. 8 and provides access to a forward blind pocket 36 into which the forward magnet 18a may be placed and access also to a rearward pocket 38 into which the rearward magnet 18b may be placed. The magnets 18a, 18b may be secured within their respective pockets 36, 38 by a bonding agent such as an epoxy resin.

Figure 9:
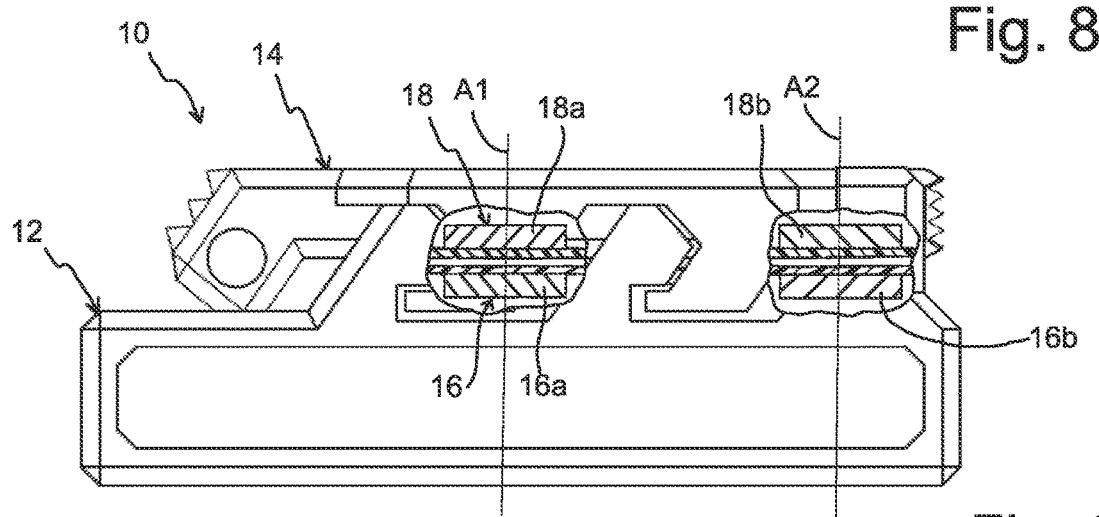
FIG. 9 is a side elevation view of the device shown partly broken away.
Figure 10:
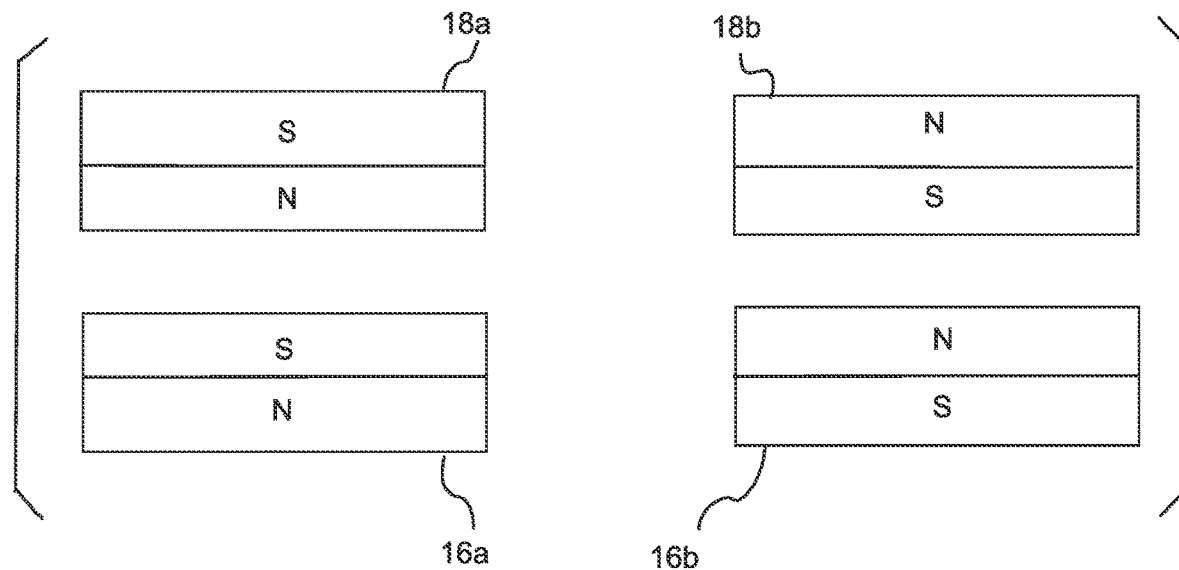
FIG. 10 is a schematic view of the magnets.

The magnets 16a, 16b and 18a, 18b are preferably self-aligning and self-centering when the forward 16a, 18a and rearward 16b, 18b pairs are brought into proximity. Each magnet is configured with a north and south pole, as schematically illustrated in FIG. 10. The forward pair of magnets 16a, 16b are arranged with their poles in a first orientation (e.g., with the south poles facing upwardly) so that the magnetic forces they produce attract and tend toward a self-centered position along common axis A1, as shown in FIG. 9. The rearward pair of magnets 16b, 18b are arranged with their poles in the same or different orientation as that of the forward magnets. In the embodiment shown, the rearward magnets 16b, 18b are arranged in the opposite pole arrangement (e.g., with their north poles facing upwardly). The rearward set of magnets 16b, 18b produce magnetic forces that also attract and tend toward a self-centered position along common axis A2. The longitudinal positions of the magnets can be selected to control the self-centered longitudinal position of the first 12 and second 14 coupling members when magnetically coupled or held against one another. In a preferred arrangement, the magnets 16a, 18a; 16b, 18b are arranged to exert a magnetic coupling force that self-centers the second coupling member 14 on the first coupling member 14 intermediate the locked and unlocked positions, as shown in FIG. 9. This position corresponds also to the intermediate position of the members 12, 14 shown in FIGS. 2, 3 and 5.

Figure 11:
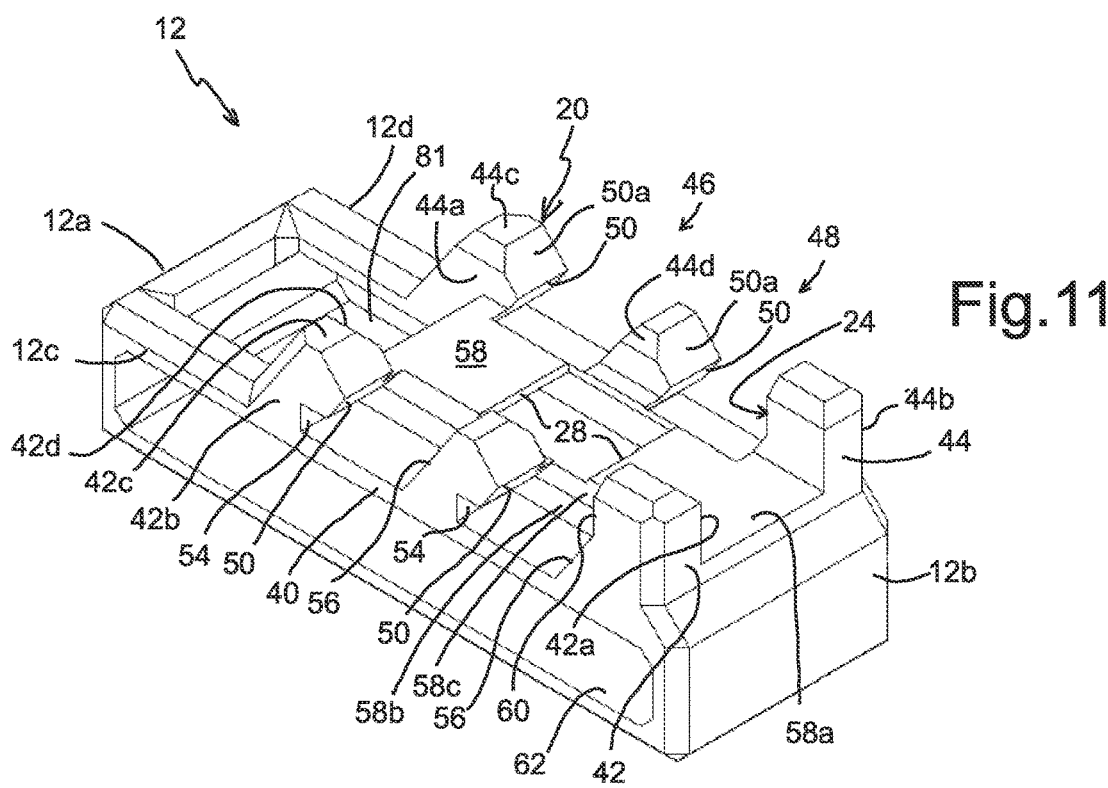
FIG. 11 is a rear isometric view of the first coupling member.
Figure 12:
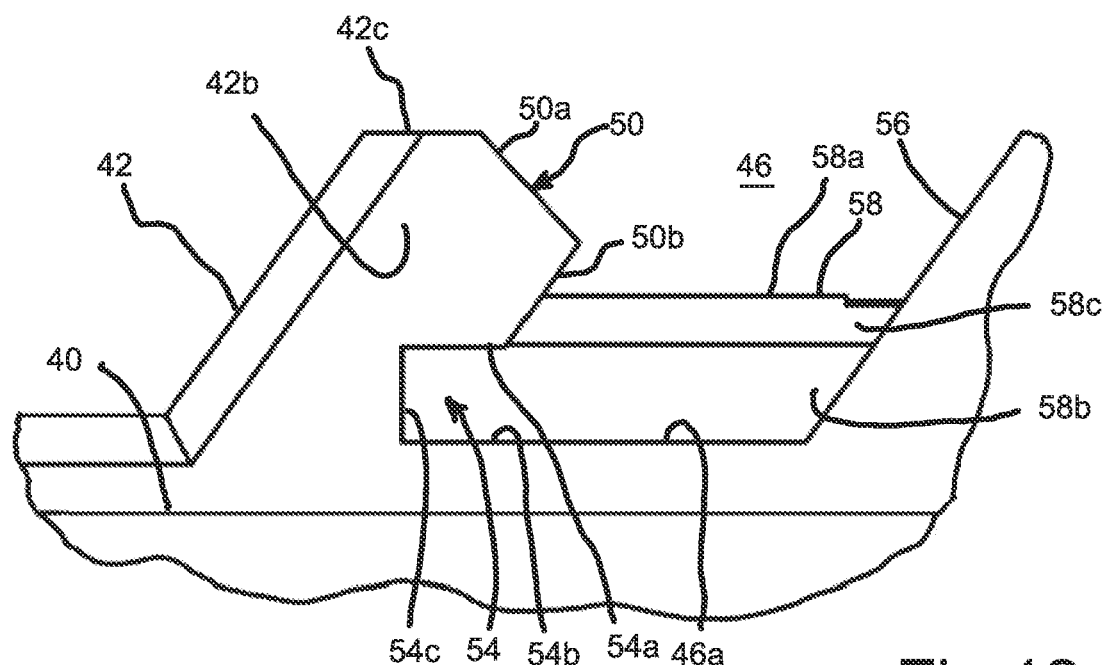
FIGS. 12 and 13 are enlarged fragmentary side views of portions of the first coupling member.

With reference to FIGS. 11 and 12, the first coupling member 12 includes a base 40 that extends longitudinally between the opposite forward 12a and rearward 12b ends of the first coupling member 12 and between laterally opposite sides 12c, 12d. A top surface of the base 40 is parallel to the slide plane P. Laterally spaced walls 42, 44 extend from the base and have inner surfaces 42a, 44a that face each other and define a longitudinal channel therebetween. The walls 42, 44 include outer surfaces 42b, 44b that face away from each other. The walls 42, 44 include top surfaces 42c, 44c. The laterally spaced walls 42, 44 include a pair of forward recesses 46 and a pair of rearward recesses 48. The recesses 46, 48 are open to the walls 42, 44 at the top and include rearward facing load bearing wall surfaces 50, 52 of the recess that face away from the forward end 12a of the first coupling member 12 and toward the rearward end 12b in non-parallel relation to the base 40 and slide plane P. The rearward facing surfaces 50, 52 may be identical in shape and include a rearwardly inclined engagement portion 50b, 52b that is inclined relative to the base 40 at an acute angle and presents an undercut surface when the first coupling member 12 is viewed from above. An upper region of the recess wall surfaces 50, 52 adjacent the top 42c, 44c of the walls 42, 44 may include forwardly slanted portions 50b, 52b that are visible from above and which may form an obtuse angle with the respect to the base 40 and slide plane 40. At or adjacent the bottom of each of the at least the rearward recess 48 and preferably all of recesses 46, 48 is a notch 54. The notches 54 commence at the rearwardly inclined engagement portions 50b, 52b and extend forwardly toward the forward end 12a of the first coupling member 12 to form a forwardly extending undercut. The notches 54 each include a top wall 54a, a forward wall 54c and a bottom wall 54b. The top and bottom walls 54a, 54b are spaced from each other and may be parallel to the base 40 and slide plane P. The bottom wall 54b may form an extension or continuation of a bottom wall 46a of the recess 46, 48 in the same plane. The forward wall 54c may be perpendicular to the top and bottom walls 54a, 54b.

Figure 13:
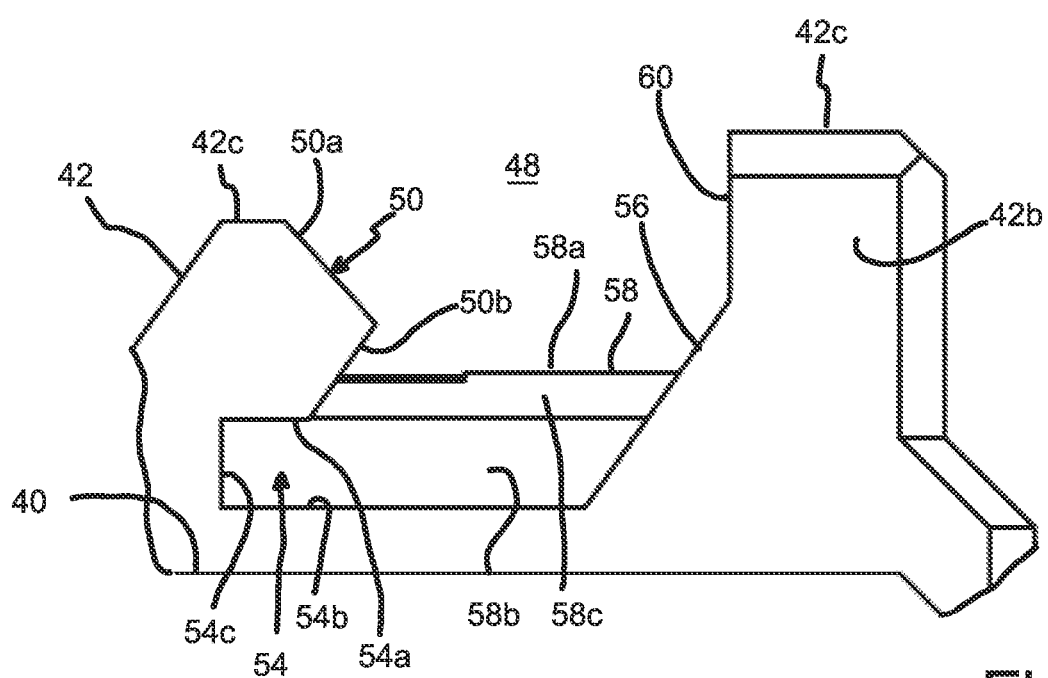

FIGS. 12 and 13 show further details of the forward and rearward recesses 46, 48 and their surfaces. Spaced longitudinally rearward from the rearward facing wall surface 50 of each recess 46, 48 is a forwardly facing back wall 56 that extends up from the bottom 46a of the recess 46. The back wall 56 is inclined rearwardly forming an obtuse angle with the bottom 46a of the recess 46 and with the slide plane P. The angle of inclination of engagement portion 50b and the back wall 56 may be the same, such that they are longitudinally spaced and parallel to each other.

In the lateral space between the side walls 42, 44 is a raised floor 58 that is spaced above the top surface of the base 40. The floor 58 has a top surface 58a that is parallel to the slide plane P and left and right outwardly facing side faces 58b that extend in a direction transverse to the base 40 and slide plane P. The raised wall 58 forms the top of the magnet pockets 30, 32. The side faces 58b present inner blocking walls to the notches 54 and a lower religion of the recesses 46, 48 closing off the notches and lower regions to the inside. The side faces 58b extend longitudinally between the forward-facing wall surface 50 and the back wall 56. A top portion 58c of the side faces 58b may be inwardly slanted or chamfered. The side faces 58b define longitudinal guides for the second coupling member 14 as will described further below.

The back wall 56 of the rearward recess 48 further includes a blocking portion 60 that is disposed perpendicular to the base 40 and to the slide plane P. The blocking portion 60 may lie anywhere along the length of the back wall 56 but is preferably provided at the upper-most region such that the blocking portion 60 extends to the top 42c, 44c of the side walls 42, 44.

The recesses 42, 44 can alternatively be seen as formed by sets of laterally spaced legs projecting up from the base 40 and presenting the above-described surfaces and portions. As illustrated in FIG. 11, there are a set of forward legs, a set of rearward legs and a set of intermediate legs with together define the above-described recesses 42, 44 and their features.

The base 40 may comprise a portion of an article to which the second coupling member 14 is to be attached, or it may include other features that enable the first coupling member 12 to be attached to other articles. In the illustrated embodiment, the base includes a strap loop feature 62 that enables a belt or strap to be received in an opening 64 of the loop feature 62. The loop feature 62 is shown as a closed loop.

Figure 14:
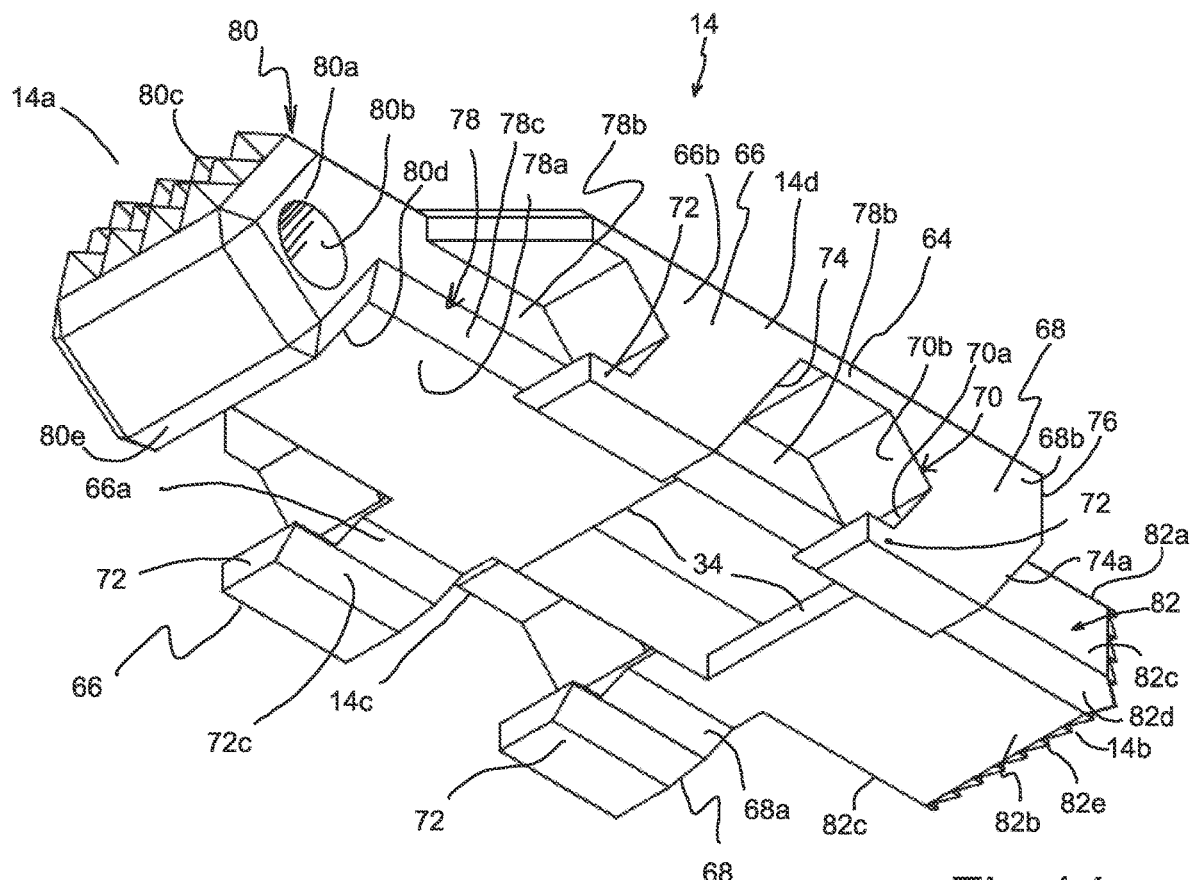
FIG. 14 is a front bottom isometric view of the second coupling member.
Figure 15:
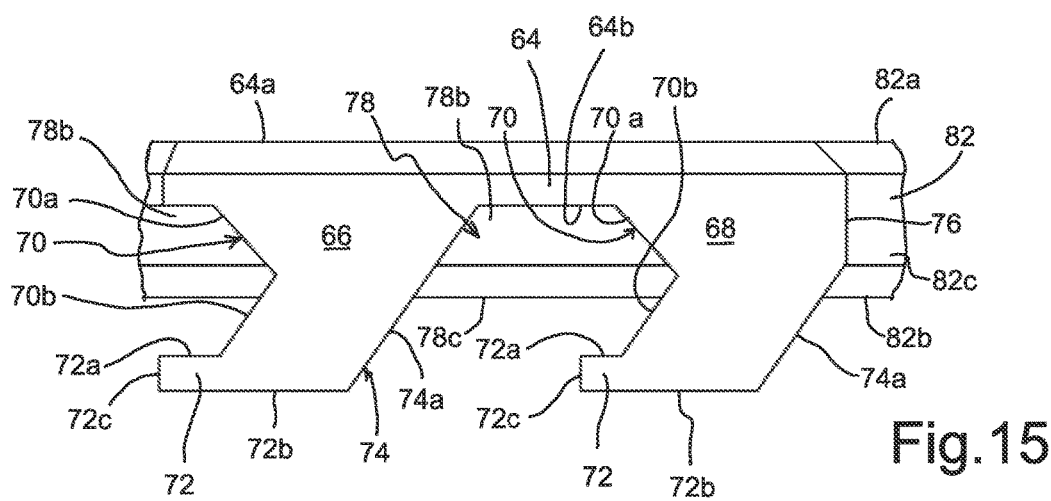
FIG. 15 is an enlarged fragmentary side view of a portion of the second coupling member.

With reference now to FIGS. 14 and 15, further details of the second coupling member 14 are shown and described. The second coupling member 14 extends longitudinally between a forward end 14a, and a rearward end 14b and laterally between opposite left and right sides 14c, 14d. The second coupling member 14 includes a base 64 that has a top surface 64a and a bottom surface 64b. A pair of forward legs 66 extend from the bottom surface 64b of the base 64. The forward legs 66 are spaced laterally from each other and include inside faces 66a that face toward one another in laterally spaced relation and outside faces 66b that face away from each other. The second coupling member 14 further includes a pair of rearward legs 68 the extend from the bottom surface 64b of the base 64. The rearward legs 66 are spaced laterally from each other and are spaced longitudinally from the forward pair of legs 66. The rearward legs 68 have inside faces 68a that face toward one another in laterally spaced relation and include outside faces 68b that face away from each other.

The interlock portions 22 include forward facing load-bearing surfaces 70 provided on at least one and preferably both of the pairs of forward and rearward legs 66, 68. The forwardly facing surfaces 70 include rearwardly inclined portions 70b of the legs 66, 68 that form an acute angle with the bottom surface 64b of the base 64 and the sliding plane P when viewed from the side as in FIG. 15. The inclined portions 70b are spaced from the base 64 by intervening portions 70a that are inclined forwardly in the opposite direction and which form an obtuse angle with the bottom surface 64b of the base 64 and slide plane P. The portions 70a and 70b correspond in relative orientation and shape to the surfaces 50a, 50b of the first coupling member 12.

At least one pair and preferably both pairs of legs 66, 68 of the second coupling member 14 include feet 72 that project forwardly from the inclined portion 70b toward the forward end 14a. The feet 72 include top 72a and bottom 72b surfaces that are preferably parallel with each other and parallel to the slide plane P. The top and bottom surfaces 72a, 72b terminate at a forward end 72c of the feet 72 which is spaced forwardly of the surface portions 70a, 70b.

The unlock portion 26 of the second coupling member 14 comprises surface features on the rearwardly facing surfaces 74 of at least one pair and preferably both pairs of legs 66, 68. The surface features include at least a rearward facing blocking surface 76 that is provided on the rearward legs 68 and arranged perpendicular to the base bottom wall 64b and to the slide plane P. The surface 76 cooperates with the blocking surface 60 of the first coupling member 12 when in the unlocked position. The unlock portions 26 may further include rearwardly inclined portions 74a on the backside of the legs, with at least those of the rearward pair of legs 68 engaging the corresponding surfaces 56 of the rearward recess 48 of the first coupling member 12 when in the unlocked condition. The forward legs 68 may likewise have the rearwardly inclined surfaces 74a of the backside of the legs 68 which may positively engage corresponding slanted surface 56 of the forward recess 46 of the first coupling member 12 when in the unlocked condition.

The second coupling member 14 includes a raised floor 78 that projects below the bottom surface 64b of the base 64 and extends laterally between the inside faces 66a, 68a of the legs 66, 68 and longitudinally beyond the legs 66, 68. The floor 78 has a bottom surface 78a that is parallel to the bottom surface of the base 64 and the slide plane P and vertically between the top face 72a of the feet and the forwardly slanted portion 70a of the legs 66, 68. The floor 78 has lateral side faces 78b that face away from each other and close the space forward of the legs 66, 68 to the inside and are in position to interact as longitudinal guide with the inside faces 42a, 44a, of the walls 42, 44 of the first coupling member 12 when coupled. Portions of the raised floor contain the pockets which house the magnets 16a, 16b.

The second coupling member 14 includes a head portion 80 at the forward end 14a and a tail portion 82 at the rearward end 14b. The head portion 80 includes the load application location 80a which is spaced forward of the legs 66, 68 and of the interlock portions 20, 22 of the assembly 10. The load application location 80a is preferably at or below the level of the rearwardly inclined portion 70b and preferably above the level of the top face 72a of the feet 72. The load application location may take the form of a cross hole 80b that may extend laterally through the head 80. Other forms of attaching a load to the head 80 pf the second coupling member 14 are contemplated. A rope, cable, D-ring, bar, etc. may be secured to the head 80 for supporting an article to be coupled, such as various gear for hunting, fishing, sports, hiking, climbing, or tools and other articles or items to be coupled, which may be carried on a person or mounted of a stationary or movable object. The head 80 preferably projects downwardly from the base 64 and has a downwardly angled front face that presents an angled press pad 80c to be selectively engaged by a user's finger or thumb and which may be textured, such as by knurling, to provide the user with a visual or blind feel indication of an engagement surface and to enhance the gripping force when engaged by a finger. The head includes a back face 80d which is angled and preferably parallel to the front face.

Both the front face 80*c* and the back face 80*d* form an obtuse angle with the bottom surface 64*b* of the base 64 and with the slide plane P. The head 80 includes a lower edge 80*e* that is disposed below the level of the bottom 72*b* of the feet 72. The lower edge 80*e* and at least part of the back face 80*d* may project into an opening or recess 81 of the first coupling member to enable the head to extend below the base 40 of the first coupling member when coupled. The recess or opening 81 includes a back edge 81*a* that is rearwardly inclined to provide a ramp surface for engagement and guidance of the head 80 during uncoupling of the members 12, 14 as will be describe further below.

The tail 82 of the second coupling member 14 extends rearward of the legs 68 and has an upper surface 82*a* that is coplanar with the top of the base 64 and a lower surface 82*b* that is coplanar with the bottom 78*a* of the raised wall 78. The tail 82 includes lateral side faces 82*c* that are received between and slideably guided by inner faces 42*a*, 44*a* of the walls 42, 44. The tail 82 has bottom edges 82*d* that are chamfered and interact with chamfered surfaces 42*d*, 44*d* of the walls 42, 44 to assist in guiding the central part of the second coupling member 12 including the tail 82 into position between the wall 42, 44. The tail 82 terminates at a rearward end 82*e* which may be knurled or textured to provide a visual and blind feel and functional gripping lever for engagement by a user's finger or thumb. The load bearing forward facing surfaces 70*a*, 70*b* are disposed between the head 80 and the tail 82.

Figure 16A:
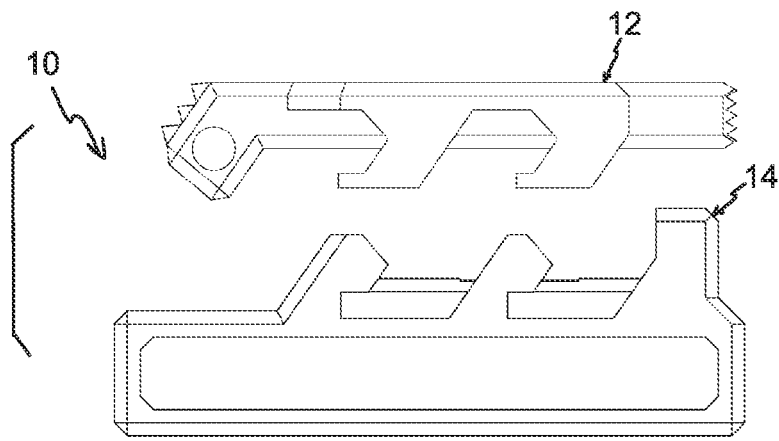
FIG. 16a-16d are side elevation views showing the coupling sequence of the first and second coupling members.
Figure 16B:
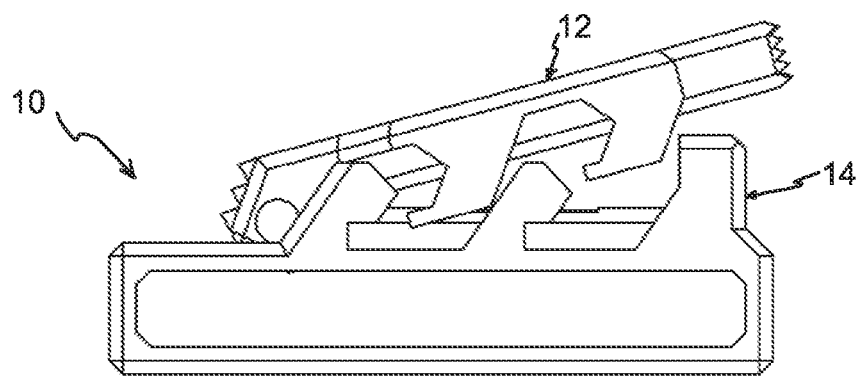
Figure 16C:
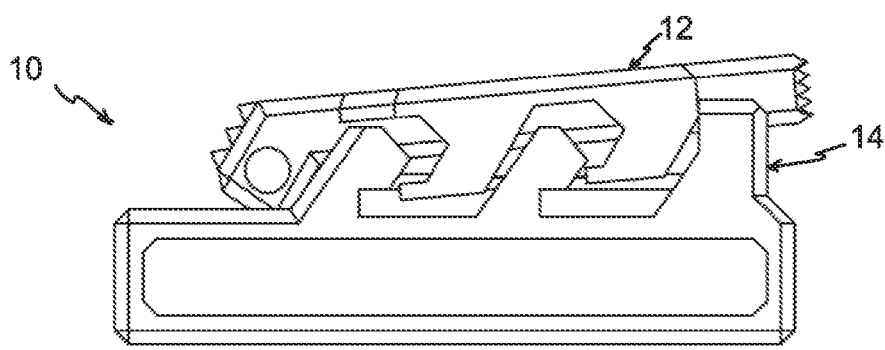
Figure 16D:
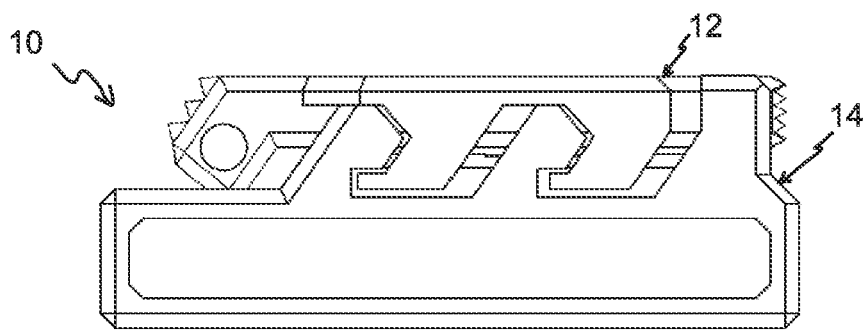

FIGS. 16*a-d* illustrate the sequence of coupling the first 12 and second 14 coupling members. As shown in FIG. 16*a*, the legs 66, 68 of the second coupling member 16 are brought into proximity of the forward and rearward recesses 46, 48 of the first coupling member 12. The magnets 18*a*, 18*b* of the second coupling member 14 are attracted by a strong magnetic pulling force to the magnets 16*a*, 16*b* of the first coupling member 12, respectively, with the magnets being arranged as schematically shown in FIG. 10 with the N/S polarities of each of the forward set 16*a*, 18*a* and the rearward set 16*b*, 18*b* arranged to exert a mutual magnetic attraction force, or vice versa. The pull of the magnetic force draws the legs 66, 68 into the recesses 46, 48 along a coupling path as shown in FIGS. 16*b* and 16*c* without additional effort by the user to the magnetically coupled position shown in FIG. 16*d*. The position of FIG. 16*d* represents the magnetically self-centered or self-aligned position which results from the magnets 16*a*, 18*a*; 16*b*, 18*b* urging the members 12, 14 into a position where the magnetic fields of the magnet pairs 16*a*, 18*a*; 16*b*, 18*b* self-align along their respective axes A1, A2 as shown also in FIG. 9. Preferably, the self-centered coupled position places the second coupling member 14 along the slide path in the slide plane P intermediate the locked and unlocked positions. In other words, when magnetically coupled with only the forces of the magnets acting upon the members 12, 14, the second coupling member 14 is spaced out of the locked position and also spaced out of the unlocked position.

Figure 17:
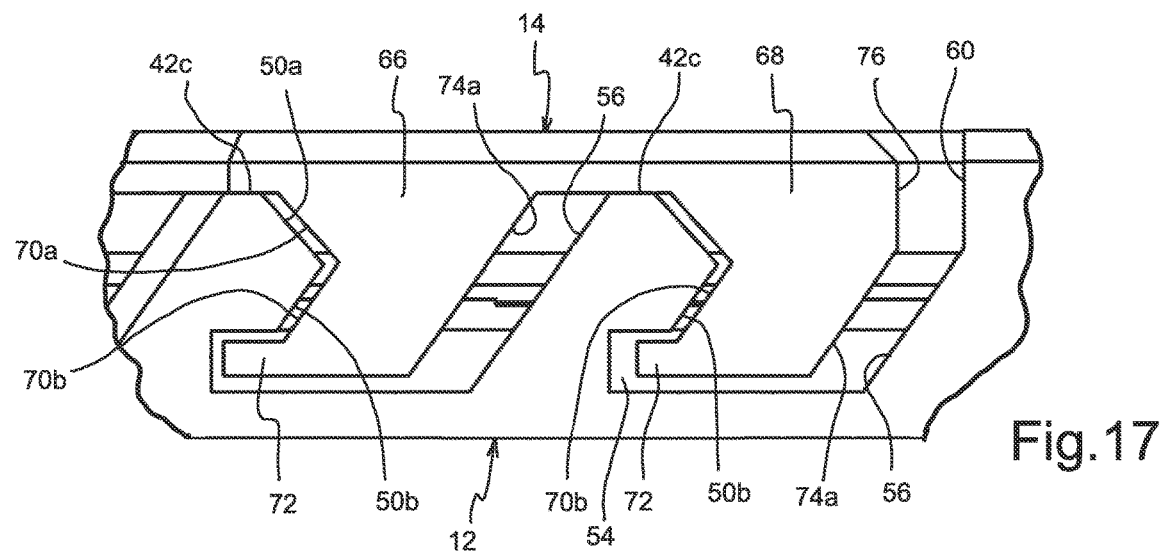
FIGS. 17 and 18 are enlarged fragmentary side views showing a portion of the device in the intermediate and locked positions.

FIG. 17 illustrates further details of the magnetically self-centered intermediate position of the member 12, 14. It will be seen that the forward-facing engaging surfaces 70*a*, 70*b* of the second coupling member 14 are spaced rearward and out of positive engagement with the corresponding rearward facing engaging surfaces 50*a*, 50*b* associated with the interlock portions 22, 20. It will also be seen that the unlock portions 26, 24 are disengaged, including surfaces 76 and 74*a* of the second coupling member being spaced forwardly of the corresponding surfaces 60, 56 of the first coupling member 12. It will also be seen that that the bottom surface 64*b* of the base 64 of the second coupling member 14 engages and is glideable along the tops 42*c*, 44*c* of the walls 42, 44.

The feet 72 are extended partially into the notches 54 when in the intermediate position with the top wall 54*a* of the notches at least partially overlying the top surfaces 72*a* of the feet 72. It will be appreciated that a separation force applied perpendicular to the slide plane P would draw the top surfaces 72*w* of the feet 72 into obstructing engagement with the top wall 54*a* of the notches 54 and preclude separation of the members 12, 14 from the magnetically coupled condition in the perpendicular direction. The same surfaces engage to preclude separation by external fore-aft tilting or rotational forces when in the intermediate position. It will further be appreciated that the inside faces of the walls and legs are blocked from lateral displacement by confrontation with the raised floors 58, 78, thus precluding separation from laterally directed forces in the slide plane but transverse to the direction of sliding. As will be explained further below, the members 12, 14 are further precluded from separating when a shear force is applied in the slide plane in either direction of sliding (toward the locked or unlocked position) by engagement of the interlock 20, 22 and unlock 24, 26 portions of the members 12, 14. Inadvertent uncoupling of the members 12, 14 from externally applied perpendicular, lateral and in-line shear forces is thus provided by the interaction of the various surfaces when magnetically coupled.

Figure 18:
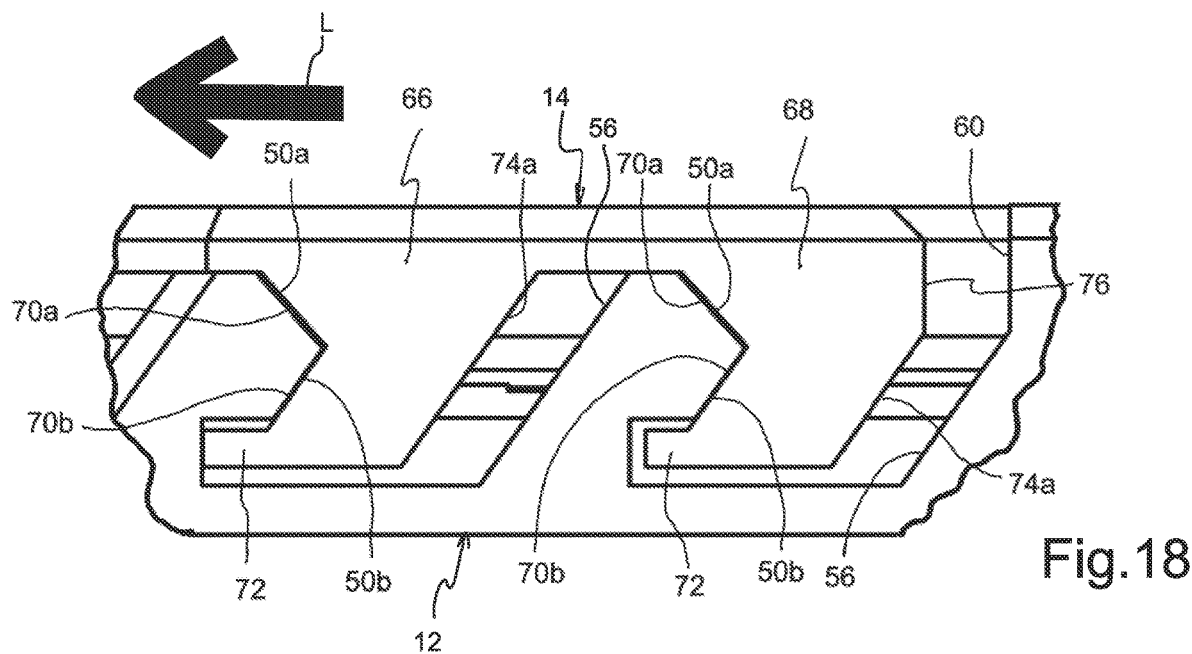

FIG. 18 illustrates further details of the members 12, 14 when slid into the locked position. The first portion 12 may be mounted for example on a strap or belt worn by a user or secured to something such as a tree or wall. The second member 12 may have an article carried off the attachment location 80*a* of the head, such as a tool hung from a loop of paracord extending through the cross opening 80*b* of the head. The weight of the attached will be enough to overcome the magnetic alignment force that initially resists sliding movement of the second coupling member 14 out of the self-centered intermediate magnetically coupled position. The weight of the item thus exerts a sliding a shear force in the direction of arrow L (toward the forward end 14*a*) which displaces the second coupling member 14 causing it to slide along the slide path of the plane P to the locked position. When in the locked position, the forward-facing rearwardly inclined engaging surfaces 70*b* of the second coupling member 14 positively engage the rearward-facing rearwardly inclined surfaces 50*b* of the first coupling member 12. The surfaces 70*a* and 50*a* may also engage, as may the forward ends 72*c* of at least the forward foot 72 engage the back wall 54*c* of the forward notch 54. The positive engagement of these surfaces enables the device 10 to support a substantial load without the members 12, 14 coming uncoupled while in the locked condition. Any separation of the members in response to load in the direction of arrow L would come at the expense of exceeding the material strength of the device 10. When in the locked condition, the device is unable to uncouple in response to externally applied perpendicular, rotational and lateral separation forces, with the surfaces described above in connection with the intermediate position of FIGS. 16 and 17 confronting under such loads to lock the device 10 against separation. Separation of the members 12, 14 in the opposite direction or directional force L is likewise precluded by engagement of the unlock portions 56, 74*a*; 60, 76 to be described in greater detail below. When an item is connected to the second coupling member 14 by a flexible cord or cable extended through the cross hole 80*b*, a load applied by or on the item in any direction will not cause or enable the uncoupling of the members 12, 14. As such, if walking through the woods, brush or in heavy crowds, any snag force in the supported item in any direction will not result in inadvertent uncoupling of the device and loss of the item due to the mechanical interlocking of the various surfaces of the device when in the coupled condition.

When the user desires to uncouple the members 12, 14 from the locked or intermediate positions, the user exerts a slight force to the second coupling member 14 along the unlocking path of the slide plane P to the unlocked position. The user then exerts a further slight force in a different direction to move the second coupling member along a release path that us directionally different than the unlocking path to overcome the magnetic holding force and uncouple the members 12, 14. As mentioned, this uncoupling of the members 12, 14 cannot be achieved by manipulating the tethered article.

Figure 19A:
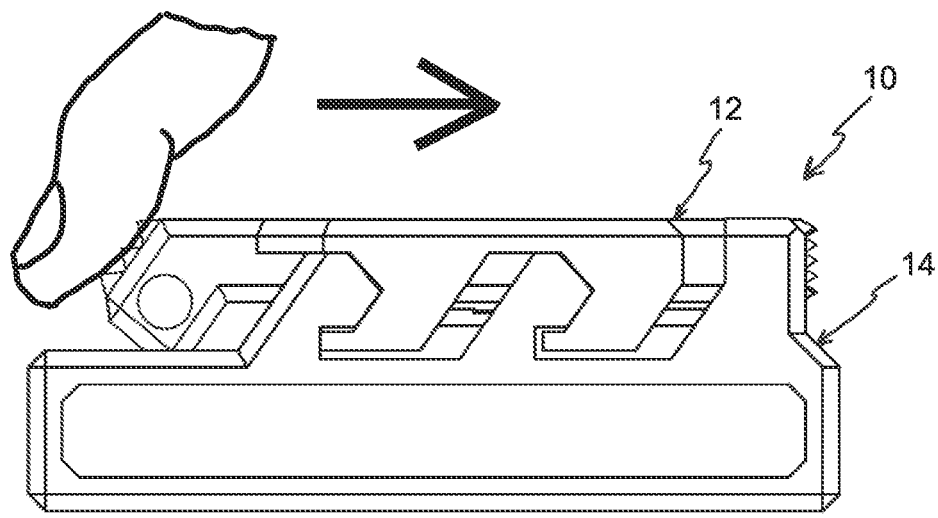
FIGS. 19a-19e are side elevation views showing the uncoupling sequence of the first and second coupling members.

FIGS. 19a-19e illustrate one preferred way for applying the necessary series of directional forces and movements required to uncouple the members 12, 14. As illustrated in FIG. 19a, the user first slides the second coupling member 14 rearward along the unlocking path to the unlocked position by placing their finger on the press pad 80c and applying a rearward sliding force in the direction of the arrow until the second coupling member 14 is in the unlocked position of FIG. 19b. The user then presses down on the press pad 80c to cause the head 80 to rotate or tilt downward where it is received into the opening 81 of the first coupling member 12. The downward rotation of the head 80 simultaneously causes the tail 82 to lift away from the first coupling member 12, overcoming the magnetic attraction force of the magnets.

Figure 19B:
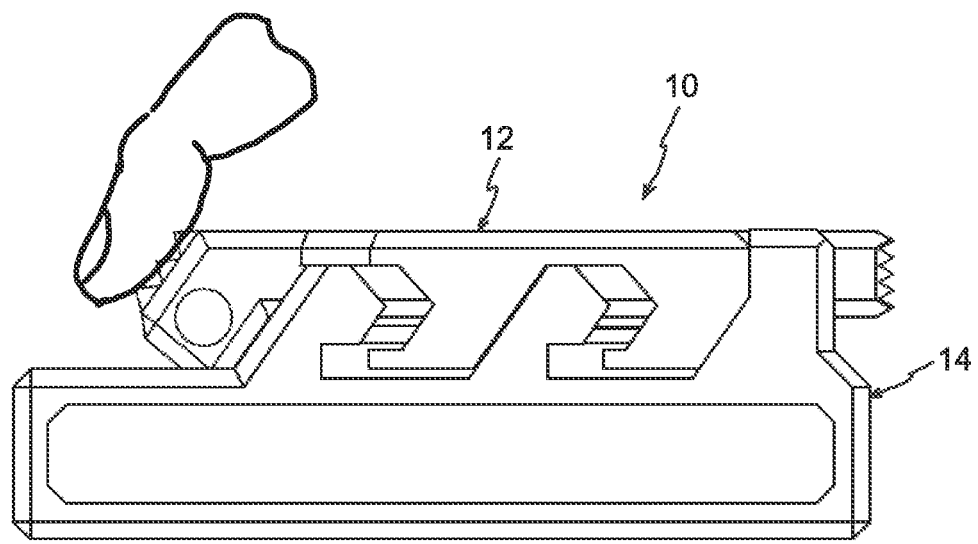
Figure 19C:
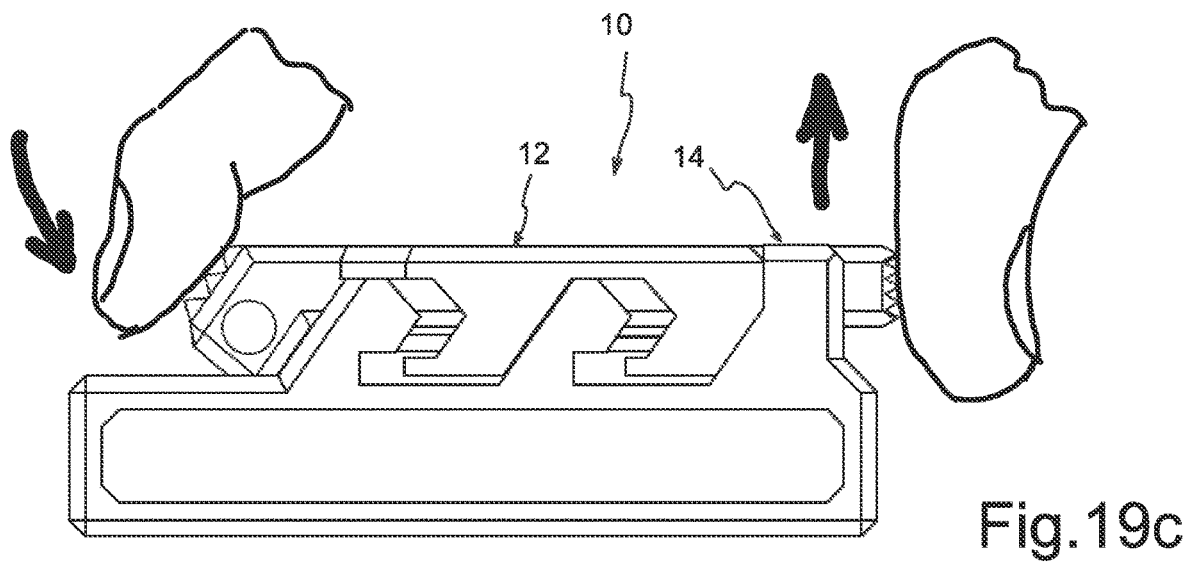
Figure 19D:
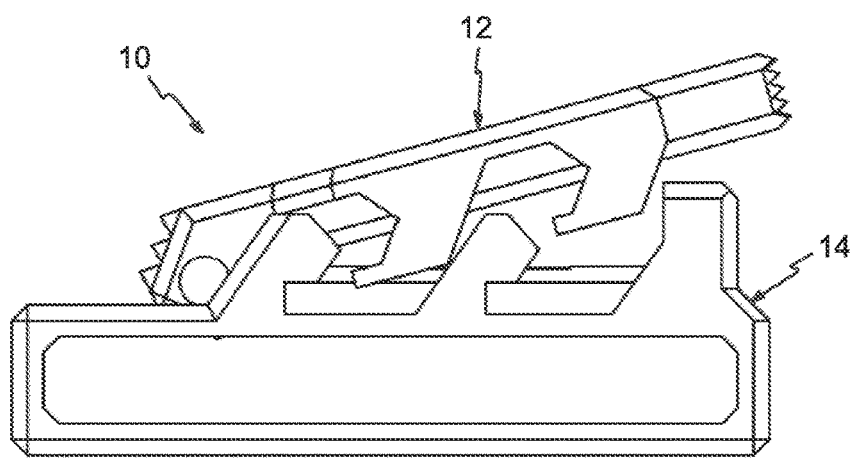
Figure 19E:
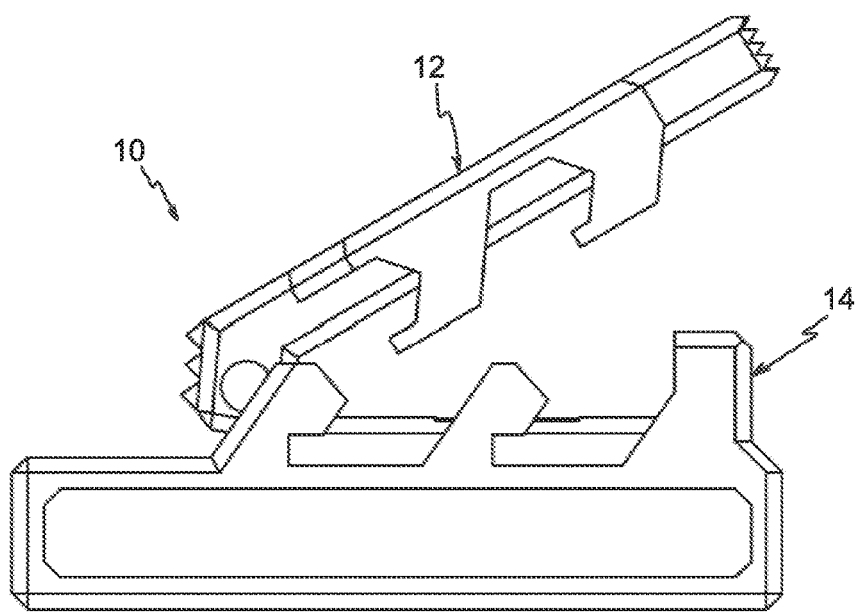

Alternatively, or in addition to the finger pivot of the head 80, the sliding of the second coupling member to the unlocked position of FIG. 19b causes the distal end 82e of the tail 82 to project outward beyond the rearward end of the first coupling member 12, thus exposing a projecting ledge of the tail 82. FIG. 19c illustrates the usage of one's thumb, alone or in combination with the downward pressing of the finger on the press pad 80c, which can engage the projecting end 82e to lift the tail away from the first coupling member 12, with the textured surface on the press pad and tail providing enhanced gripping to assist the manipulation of the second coupling member 14. The user may continue the pivoting movement while also dragging or sweeping the head 80 rearward with the finger, with the backside 80d and lower edge 80e of the head 80 engaging and gliding along the ramped back edge 81a of the opening 81. Once disengaged, the user may lift the second coupling member 14 free of the first coupling member 12.

A further key feature of the device is that the attachment, movement and uncoupling of the second coupling member 14 relative to the first can be achieved with a single hand and without requiring a direct line of vision to the device. The magnets assist in the blind positioning and coupling of the members 12, 14 and the knurled press pad and tail end provide sensory indication of the proper engaging locations for the user's finger and thumb for uncoupling.

It will be appreciated that attempting to couple the second coupling member 14 to the first coupling member 12 by having the second coupling member turned 180 degrees or by trying in guide the rearward legs 68 into the forward recesses 46 is met with a magnetic repulsion force, as the poles of the magnets in these orientations will be improperly aligned (N facing N and S facing S) as is apparent from FIG. 10 if one were to shift the top set of magnets 18a, 18b to the left so that 18b was arranged over 16a and their S-S poles facing one another, or turn them 180 degrees relative to the bottom set so 18b is over 16a (S-S orientation) and 18a is over 16b (N-N orientation). Use of sufficiently strong permanent magnets will reject an attempted improper insertion and the self-aligning attraction force will reorient and force the originally shifted members 12, 14 into proper longitudinal position for self-coupling. This arrangement of the magnets is intentional so that the members 12, 14 can only be connected in one way and to assist the user in making a proper blind connection.

Figure 20A:
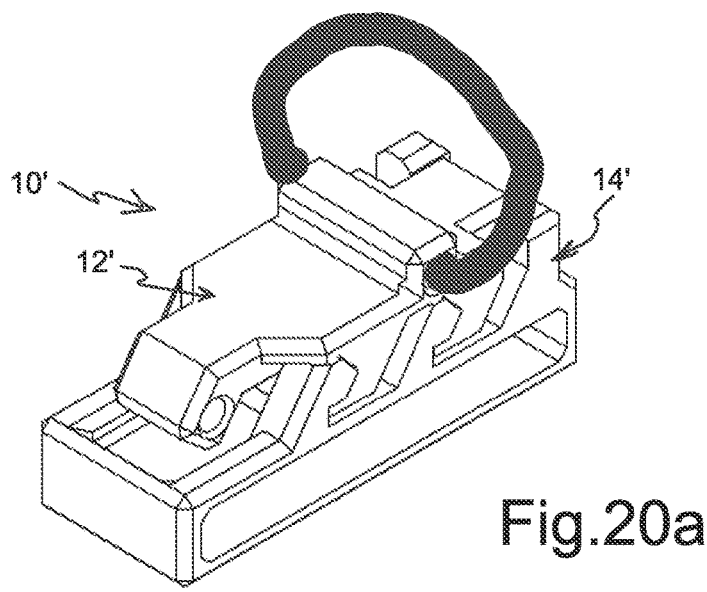
FIGS. 20a-20c are front isometric views of an alternative embodiment showing the uncoupling sequence of the first and second coupling members.
Figure 20B:
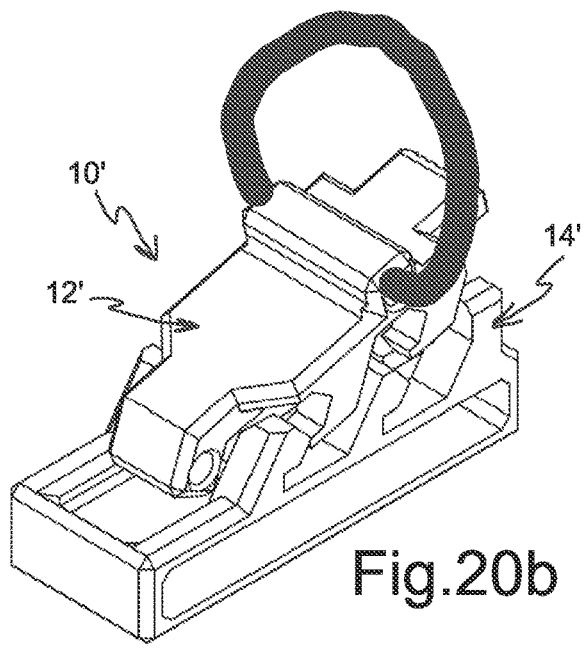
Figure 20C:
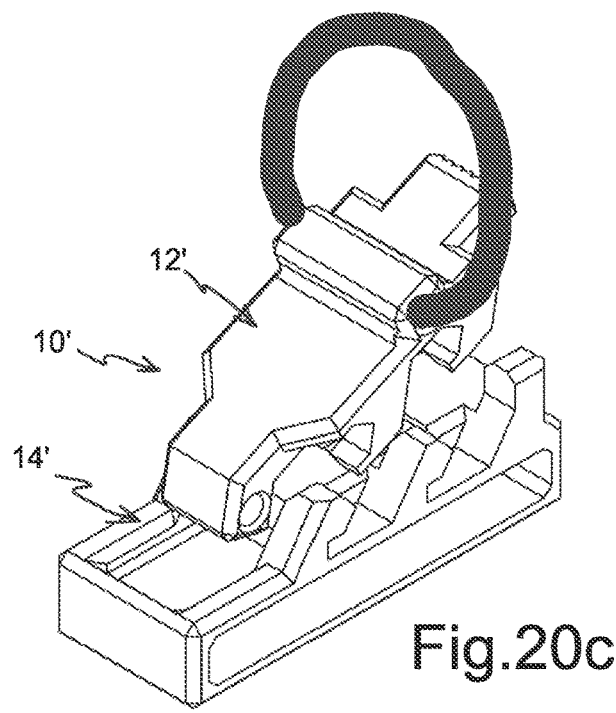

FIGS. 20a-20c illustrate an alternative embodiment of a coupling device 10', wherein all features are the same as the first embodiment 10 and will not be repeated. The features and description for device 10 is incorporated herein by reference for the alternative embodiment 10' unless otherwise noted. The device 10' includes first 12' and second 14' coupling members with the same magnetic and coupling features and are moveable between locked and unlocked positions as well as intermediate positions as above. The primary difference is that the second coupling member 14' includes an uncoupling member 90 adjacent the back. The uncoupling member 90 is in the preferred form of a pull loop, which may be executed in the form of a length of paracord or the like. The loop 90 is secured to a raised boss 92 formed on top of the second mounting member at a location spaced behind and above the front legs. The loop 90 enables a user to uncouple the members 12', 14' by grasping the loop 90 and drawing the second coupling member 14' rearwardly to the uncoupled position and upwardly to lift the back of the second coupling member 14' away from the first coupling member 12'. The loop 90 may alternatively be used by inserting a finger through the loop from the back and then releasing the second coupling member 14' in the same manner described above for the first embodiment, with the loop 90 helping capture the second coupling member 14' on the user's finger once uncoupled and also helping to exert leverage on the second coupling member 14' when lifting the back free of the first coupling member 12'.

It will be understood the embodiments described above are exemplary and not limiting in nature. The invention may be practices in other ways than described, The invention is defined by the claims.

What is claimed is:

1. A coupling device for releasably coupling two parts with one another, comprising:
   a first coupling member having a first magnetic portion;
   a second coupling member having a second magnetic portion, the first and second magnetic portions magnetically attracting each other when selectively positioned to magnetically couple the first and second coupling members together with a magnetic holding force;
   the first coupling member having a rigid first interlock portion and the second coupling member having a rigid second interlock portion, the second interlock portion engaging the first interlock portion when the second coupling member is moved to a locked position to mechanically couple the first and second coupling members against separation and to limit relative displacement of the first and second coupling members in a first load bearing direction;
   the first coupling member having a rigid first unlock portion and the second closure member having a rigid second unlock portion, the second coupling member being slideable along an unlocking path out of the locked position and into an unlocked position in which the first unlock portion engages the second unlock portion; and wherein the second coupling member, when in the unlocked position, is releasable from the first coupling member by displacing the second coupling member away from the first coupling member along a release path that is directionally different than the unlocking path with sufficient force to overcome the magnetic holding force; and wherein the first coupling member includes a base and laterally spaced side walls extending from the base and the first interlock portion comprising forward and rearward recesses with rearwardly slanted wall surfaces, and wherein the second coupling member includes a base and wherein the second interlock portion includes laterally spaced forward and rearward legs that have rearwardly slanted wall surfaces and which are receivable into the forward and rearward recesses of the first coupling member.

2. The device of claim 1, wherein the second coupling member is tiltable relative to the first coupling member when displaced along the release path.

3. The device of claim 2, wherein the second coupling member, when in the locked position, is locked against tilting movement relative to the first coupling member.

4. The device of claim 3, wherein the second coupling member includes a load carrying application location and wherein load carrying portion of the second coupling member is disposed between the load carrying application location and the second unlocking portion.

5. The device of claim 4, wherein the second coupling member includes a head portion at one end of the second coupling member and a tail portion at an opposite longitudinal end of the second coupling member.

6. The device of claim 5, wherein the head portion includes a load carrying application location for supporting a load to be carried by the device.

7. The device of claim 6, wherein the head portion is tiltable toward the first coupling member and the tail portion is tiltable away from the first coupling member when the second coupling member is in the unlocked position.

8. The device of claim 7, wherein the head portion includes a press pad engageable by a user's finger for applying a force to first slide the second coupling member from the locked position to the unlocked position and then to tilt the head portion toward the first coupling member to tilt the tail portion away from the first coupling member.

9. The device of claim 8, wherein the first coupling member includes a recess for receiving the head portion when tilted toward the first coupling member.

10. The device of claim 9, wherein the first coupling member includes a guide surface engaging the head portion when tilted and guiding the head portion toward the first load carrying portion.

11. The device of claim 1, wherein the forward and rearward legs of the second coupling member include feet which extend forward of the rearwardly slanted wall surfaces of the first coupling member and are received in notches of the first coupling member that are undercut into the rearwardly slanted wall surfaces of the first coupling member when in the locked position.

12. The device of claim 11, wherein the rearwardly slanted wall surfaces of the first coupling member overlie the feet in both the locked and unlocked conditions to preclude detachment of the second coupling member from the first coupling member when a separation force is applied perpendicular to the unlocking path.

13. The device of claim 12, wherein the rearward recesses and rearward legs include blocking surfaces disposed perpendicular to the unlocking path.

14. The device of claim 13, wherein the second coupling member includes a head portion that extends between the side walls and forward of the slanted wall surfaces and includes a load carrying application portion for supporting a load to be carried by the head portion forward of the slanted wall surfaces and a tail portion that extends between the side walls.

15. The device of claim 14, wherein the first coupling member includes longitudinal guide rails inward of the forward and rearward recesses and in position to engage with inward faces of the legs of the second coupling member to provide longitudinal guidance between the locked and unlocked positions and to preclude lateral separation of the first and second members when in and when moving between the locked and unlocked positions.

16. The device of claim 15, wherein side faces of the tail portion of the second coupling member are guided by inward faces of the side walls of the first coupling member to provide further longitudinal guidance during movement between the locked and unlocked positions and to further prevent lateral separation when in and when moving between the locked and unlocked positions.

17. The device of claim 16, wherein when the second coupling member is slid to the unlocked position, an end of the tail portion extends rearwardly beyond the base of the first coupling member and is selectively engageable by a finger or thumb to leverage the rearward end of second coupling member pivotally away from the first coupling member along the unlocking path.

18. The device of claim 1, wherein the magnetic portions comprise a forward set of permanent magnetics of a first opposite polarity and a rearward set of permanent magnets of a second opposite polarity arranged in the respective first and second coupling members to magnetically attract and couple when rearward legs are guided toward receipt into the rearward recess and the forward legs are guided toward receipt in the forward recess, and to magnetically repel when the rearward legs are guided toward receipt in the forward recess, and to further magnetically repel when the forward legs are guided toward receipt in the rearward recess.

19. The device of claim 18, wherein the permanent magnets are constituted to have an automatic self-centering effect when their respective flux fields are aligned, and wherein the magnets are positioned to self-center the second coupling member intermediate the locked and unlocked positions.

20. A coupling device, comprising:
a first coupling member having at least a first magnetic portion with a magnetic axis;
a second coupling member having at least a second magnetic portion with a magnetic axis, the first and second magnetic portions magnetically attracting each other when selectively positioned to magnetically couple the first and second coupling members together in a first position in which the first magnetic axis is aligned with the second magnetic axis and with a magnetic holding force which magnetically resists separation of the first and second members and which magnetically resists relative longitudinal sliding movement of the first and second members from the first position;

the first coupling member having at least one forward facing abutment surface and at least one rearward facing abutment surface spaced longitudinally from the at least one forward facing abutment surface;

the second coupling member having at least one forward facing abutment surface and at least one rearward facing abutment surface spaced longitudinally from the at least one forward facing abutment surface; and wherein the at least one forward facing abutment surface of the first coupling member faces and is spaced from the at least one rearward facing abutment member of the second member when the first and second coupling members are in the first position, and the at least one rearward facing abutment surface of the first coupling member faces and is spaced from the at least one forward facing abutment surface of the second member when the first and second coupling members are in the first position.

\* \* \* \* \*